O. RICE.
METHOD OF GUIDING CIRCULAR AND OTHER SAWS.
No. 15,304.
PATENTED JULY 8, 1856.
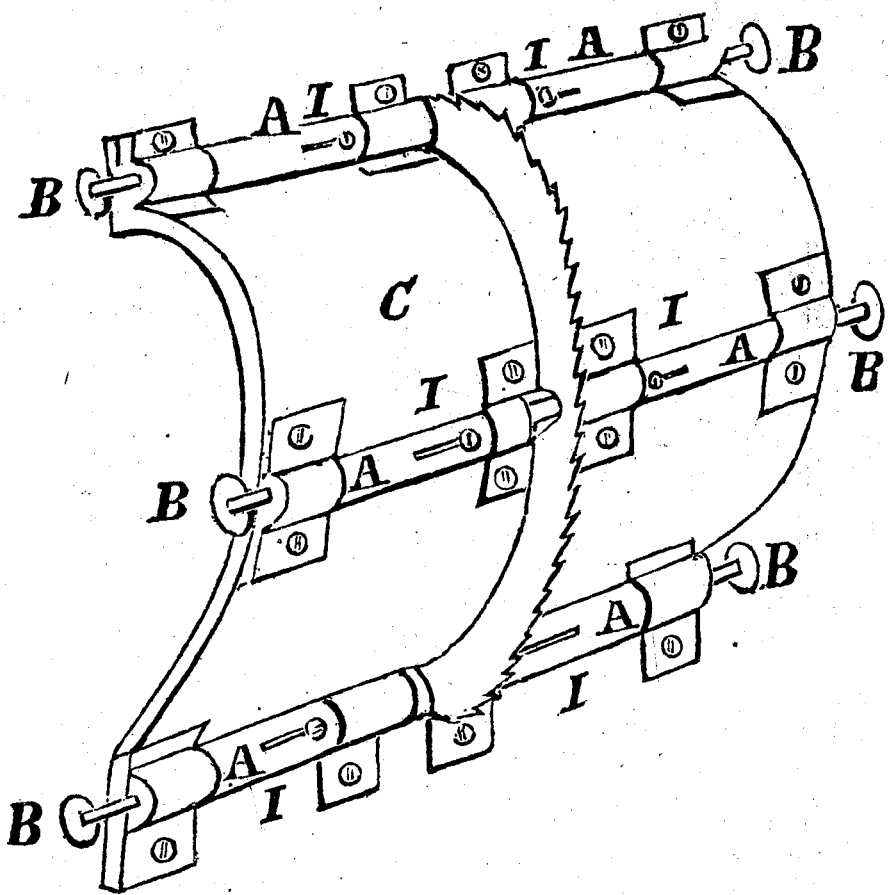
TAKEN FROM PATENT OFFICE REPORT
1856 - VOL.III.
ONLY DRAWING ACCESSIBLE (1912)

UNITED STATES PATENT OFFICE.

ORRIN RICE, OF CINCINNATI, OHIO.

METHOD OF GUIDING CIRCULAR AND OTHER SAWS.

Specification of Letters Patent No. 15,304, dated July 8, 1856.

*To all whom it may concern:*

Be it known that I, ORRIN RICE, of Cincinnati, Hamilton county, State of Ohio, have invented new and useful improvements in the steadying, guiding, and strengthening while in motion of circular and all other saws run by power; and I do hereby declare the following to be a full, clear, and exact description of the manner of applying and using the same, reference being had to the annexed drawings, making part of this specification, in which—

Figure (1) is an upper view showing the table and upper portion of saw. Fig. (2) is an under view of table and saw, showing the application of one pair of spring pegs. Fig. (3) is a sectional view of under portion of saw supported by these pairs of spring pegs, the object being to extra strengthen a very thin saw, thereby saving from one third to one half of the cut required by running a saw sufficiently thick to stand without these supports, and as a result a very great saving is secured especially in sawing valuable woods.

In the annexed drawings (*a*) is a hollow tube closed at back end to confine a spring, which may be made of any elastic substance, to be operated against by the set screw (B) for strengthening or weakening the spring at pleasure, according to circumstances. The other or front end is open to admit of a wooden peg, or any other substance, into which a screw or pin is placed through the slot (I) in tube (A) to prevent the peg or bolt from being pressed by the spring and temper screw, beyond a certain fixed limit, so as to keep the saw in line.

In Fig. (3) (*c*) is an arch or bridge constructed according to size of saw, for placing one or any number of springs with pegs or bolts, or any other attachment of anti-heating and wearing nature, near the circumference of the saw.

It has always been, and still is, a very serious objection in converting logs or timber into boards with saws, the immense loss occasioned by using saws, sufficiently thick and strong to prevent buckling or springing, thereby taking so wide a kerf, and waste by sawdust. My improvement obviates this difficulty by the aforesaid anti-friction appliances. There has also been another objection to using large circular saws for sawing logs into timber or boards. The saw presents so large a surface to the log (some of them being six, or seven feet in diameter) the least spring sidewise in the log, while the saw is running through those logs having knots, nurls, or crooks are always liable to spring and buckle the saw, unless the saw can move sidewise so as to accommodate itself either way to the spring of the log. My improvement obviates this difficulty entirely in the following way. By placing my spring peg as seen in the drawings, on each side of the saw exactly opposite each other, leaving the mandrel unconfined by shoulders, so as to give sufficient lateral or endwise motion. The saw is held steady, and at the same time permitted to move gently and easily, either way more or less according to the spring of the log. The saw is also brought easily and certainly back in line by the hard pressure of the peg on the side farthest from the line, and lightly on the other, directly below where the saw first strikes the log.

The nature of my invention consists in the mode of making, using or applying, a spring peg or any number of spring pegs with temper screws attached, so as to increase or decrease the pressure on the saw, according to the requirements of the case, to be applied to one or both sides, either single double or in pairs to a circular or any other description of saws, used for cutting or splitting boards plank logs or any kind of timber or any other substance cut by saws, either circular upright, or any other shape.

I claim—

1. The application of the spring in any shape or form, to any anti-friction substance to be applied directly against the saw, and by traversing over the uneven surface thereof preventing the saw from trembling, and for strengthening steadying and guiding the same while in motion, thereby enabling a much thinner saw of the same diameter to be used, than otherwise could be without the application of my improvement thereby effecting a great saving in power timber and repairs.

2. Also the application to govern the side moving or lateral motion of large saws for sawing logs, occasioned by the springing of the same.

ORRIN RICE. [L. S.]

Witnesses:
   A. F. CALLAHAN. [L. S.]
   JNO. A. JEFFERS. [L. S.]